United States Patent [19]
Arakawa et al.

[11] Patent Number: 4,937,096
[45] Date of Patent: Jun. 26, 1990

[54] MANUFACTURING METHOD FOR A CERAMIC CAPACITOR

[75] Inventors: Hajime Arakawa; Osamu Yamaoka; Motoaki Kakio, all of Nagaokakyo, Japan

[73] Assignee: Murata Manufacturing Co., Ltd., Kyoto, Japan

[21] Appl. No.: 224,007

[22] Filed: Jul. 25, 1988

[30] Foreign Application Priority Data

Jul. 23, 1987 [JP] Japan ................... 62-184343

[51] Int. Cl.$^5$ .............................................. B05D 5/12
[52] U.S. Cl. ...................................... 427/80; 427/279; 427/284; 427/376.1; 427/376.2; 427/376.3
[58] Field of Search .............. 427/80, 279, 284, 376.1, 427/376.2, 376.3; 361/305, 320, 303; 338/21

[56] References Cited

U.S. PATENT DOCUMENTS

| | | | |
|---|---|---|---|
| 4,215,385 | 7/1980 | Behn et al. | 361/305 |
| 4,323,948 | 4/1982 | Mercier et al. | 361/303 |
| 4,397,886 | 8/1983 | Neirman et al. | 427/80 |
| 4,419,310 | 12/1983 | Burn et al. | 427/80 |
| 4,460,622 | 7/1984 | Yamaoka et al. | 427/80 |
| 4,822,645 | 4/1989 | Oda et al. | 427/96 |

Primary Examiner—Stanley Silverman
Attorney, Agent, or Firm—Wenderoth, Lind & Ponack

[57] ABSTRACT

A manufacturing method for a ceramic capacitor superior in breakdown voltage ability, comprising a process of baking opposite electrode on the surface of ceramic dielectric composed mainly of metal oxide and that, simultaneous with or after the above process, of baking in a ring-like shape insulating layers for air cutoff on at least the edges of an electrode.

The opposite electrodes are formed by baking on the ceramic dielectric an electrode material composed mainly of metal of oxidization property more intense than that of the metal oxide at the ceramic dielectric material, in which, when the insulating layers on the electrode are baked, parts covered with the insulating layers at the opposite electrodes are cutoff from air, so that the ceramic dielectrics just below the parts are deprived by the opposite electrodes of inner oxygen so as to be intensively reduced and the reduced areas each become a semiconductor to largely decrease an insulating resistance value, thereby relaxing a potential gradient at the edge of the electrode and improving the breakdown voltage ability.

10 Claims, 1 Drawing Sheet

MANUFACTURING METHOD FOR A CERAMIC CAPACITOR

(FIELD OF THE INVENTION)

The present invention relates to a manufacturing method for a ceramic capacitor, for example, of medium or high voltage, and more particularly to a manufacturing method for a ceramic capacitor in the breakdown voltage ability.

(DESCRIPTION OF THE PRIOR ART)

FIG. 3 shows an example of a ceramic capacitor for medium voltage or high voltage of, for example, several hundreds through KV order rated voltage.

The ceramic capacitor 2 is the so-called single plate capacitor, in which a disc-like-shaped ceramic dielectric 3 is provided at both the opposite main surfaces with opposite electrodes 4a and 4b in such a manner that an electrode material (silver paste) usually composed mainly of silver is painted by screen process printing or the like except for the outer peripheral portion and rings or gaps G between the outer peripheral and the round electrodes at both the main surfaces and then baked, both the opposite electrodes 4a and 4b being connected at need with lead wires respectively.

The relation between the length of each gap G at the ceramic capacitor 2 and the breakdown voltage (BDV) is exemplified in FIG. 4.

Namely, the gap G theoretically is zero and the breakdown voltage is the maximum as shown by the dotted line, but actually it is not ideal to process the end of ceramic dielectric 3 (for example, because the ceramic dielectric 3 is chipped at the end, or the electrode material drops along the side surface of ceramic dielectric), whereby the breakdown voltage drops as shown by the solid line and its variation is larger.

When the electrode material is painted by the screen process printing, it is actually difficult to eliminate the gap G.

Accordingly, generally, the opposite electrodes 4a and 4b are formed leaving each gap of a certain width, thereby creating the problem in that the breakdown voltage ability is not large.

(OBJECTS OF THE INVENTION)

A first object of the present invention is to provide a manufacturing method for a ceramic capacitor, which improves the breakdown voltage ability more than the conventional one.

A second object of the present invention is to provide a manufacturing method for a ceramic capacitor, which can miniaturize the ceramic capacitor instead of improvement in the breakdown voltage ability.

A third object of the present invention is to provide a manufacturing method, which can simply efficiently manufacture a ceramic capacitor superior in breakdown voltage ability.

These and other objects of the invention will be seen by reference to the description taken in connection with the accompanying drawings.

(DETAILED DESCRIPTION OF THE INVENTION)

Figure 1:
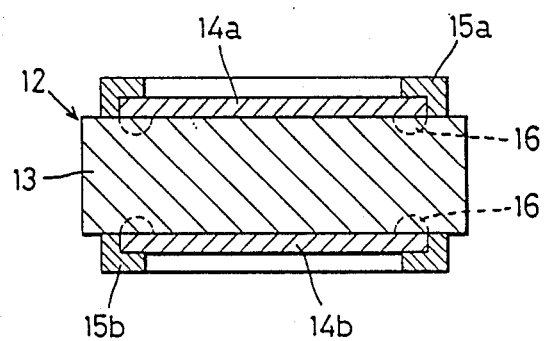
FIG. 1 is a sectional view exemplary of a ceramic capacitor manufactured by the manufacturing method of the invention.
Figure 2:
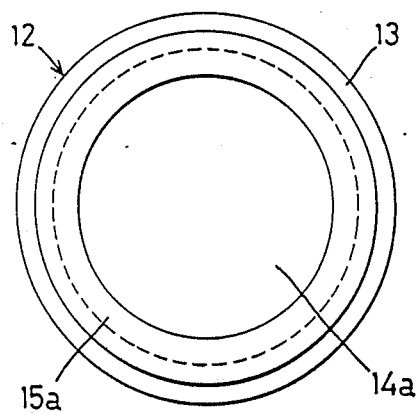
FIG. 2 is a plan view of the ceramic capacitor in FIG. 1.

Referring to FIGS. 1 and 2, a ceramic capacitor 12 is manufactured by the method of the present invention in such a manner that a disc-like ceramic dielectric 13 composed mainly of metal oxide, such as, strontium titanate series ($SrTiO_3$ series) or barium titanate series ($BaTiO_3$ series), is prepared, and at the two opposite main surfaces of the ceramic dielectric 13 is painted by the screen process printing or the like conductive paste composed mainly of aluminum powder containing glass powder. In this case, the gap as above-mentioned is provided between each electrode and the edge of ceramic dielectric 13.

The entire ceramic capacitor is put in a furnace and heated in the air at, for example, a maximum temperature of about 800° C. for about two hours and the electrode material is baked onto the surface of ceramic dielectric 13 to thereby form opposite electrodes 14a and 14b.

Next, glassy insulating layers 15a and 15b each composed mainly of, for example, lead oxide or silica to cut-off air is ring-like-shaped in a manner of being laid across the edges of opposite electrodes 14a and 14b and the outer peripheral portion of the ceramic dielectric 13 (in other words, the ring has an outer diameter larger than a diameter of each electrode 14a or 14b and an inner diameter smaller than that), and then painted by use of the screen process printing or the like.

The insulating layers 15a and 15b are baked onto the ceramic dielectric material 13, for example, under about the same condition as the baking of opposite electrodes 14a and 14b. At the above-mentioned process, aluminum constituting the opposite electrode 14a and 14b is more active in oxidization reaction than silver used in the conventional electrode, and more intense in oxidization property than the metal oxide forming the ceramic dielectric 13, whereby when the opposite electrodes 14a and 14b are baked, the portions of ceramic dielectric 13 under the electrodes 14a and 14b are somewhat reduced.

Furthermore, the portions of ceramic dielectric 13 covered by the insulating layers 15a and 15b are cut-off from the atmosphere, whereby the ceramic dielectric 13 just below the electrodes 14a and 14b, when the insulating layers 15a and 15b are baked, is deprived of inner oxygen especially by aluminum in the opposite electrodes 14a and 14b, thereby being intensively reduced.

The areas 16 intensively reduced are ring-like-shaped along the circumferential edges of opposite electrodes 14a and 14b respectively, which become semiconductors and are of insulation resistance value of, for example, about $10^8 \Omega$, thereby being largely decreased in comparison with the aforesaid usual insulation resistance value of $10^{12}$ to $10^{14} \Omega$ of the ceramic dielectric 13.

Figure 3:
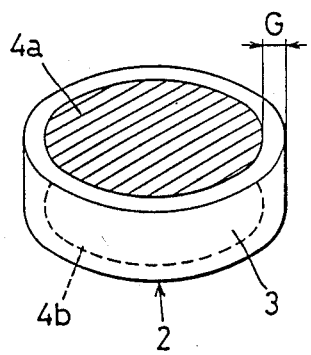
FIG. 3 is a perspective view exemplary of the conventional ceramic capacitor.
Figure 4:
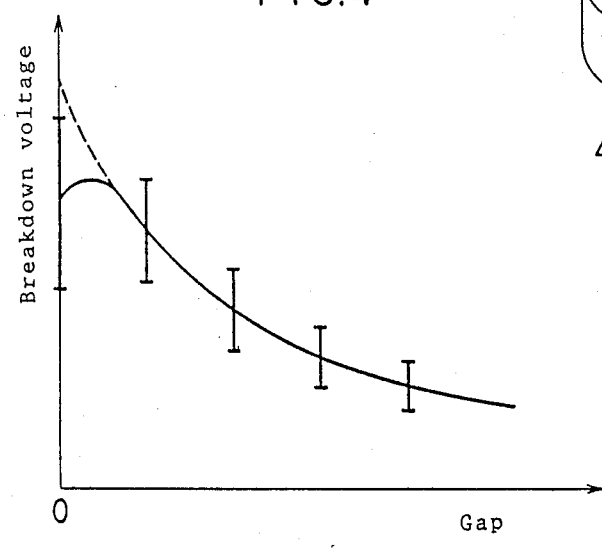
FIG. 4 is a graph exemplary of the relation between a length of the gap at the ceramic capacitor and the breakdown voltage.

At the conventional disc-like capacitor shown in FIG. 3, the potential gradient at the edge of each of the opposite electrodes, whereby dielectric breakdown is easy to occur at the edge, which is a factor of lowering the breakdown voltage ability. The ceramic capacitor 12, however, is the semiconductor at the portion of enlarged potential gradient, that is, the areas 16 below the edges of opposite electrodes 14a and 14b become semiconductors and about round in configuration of depth of the area, thereby relaxing the potential gradient. As a result, the breakdown voltage ability is improved in comparison with the conventional one.

For example, breakdown voltage of such ceramic capacitor 12 is improved in the DC breakdown voltage 1.4 to 2.2 times as large as the breakdown voltage of the conventional ceramic capacitor using the silver electrodes and of the same capacity and the same size, in Ac breakdown voltage 1.4 to 2.4 times as large as the same, and in impulse breakdown voltage 1.4 to 1.6 times as large as the same.

In one view, when such ceramic capacitor 12 is made equal in the capacity and breakdown voltage to the conventional capacitor 2, its volume can be about 70%, thereby leading to miniaturization of the capacitor.

Since the conventional ceramic capacitor 2 is apt to create migration in silver of material for the opposite electrodes 4a and 4b, the problem is created in that a creeping distance between both the opposite electrodes 4a and 4b is smaller with the lapse of time for use to create dielectric breakdown at the creeping. However, the ceramic capacitor 12 uses no silver for the opposite electrodes 14a and 14b, thereby solving the above problem.

In addition, the ring-like insulating layers 15a and 15b may be formed radially inwardly from the edges of the opposite electrodes 14a and 14b, in an extreme case, may be formed on an about entire surface except for the portions where the lead wires are connected to the electrodes 14a and 14b. In this case, the intensively reduced area 16 is formed on approximately the entire surface under the opposite electrodes 14a and 14b, but relaxation of potential gradient at the edge of each electrode 14a or 14b is not different from the above.

Alternatively, after the aforesaid electrode material is painted on the surface of ceramic dielectric 13, the aforesaid insulating layers 15a and 15b may be painted on the ceramic dielectric 13 in a manner of riding over from the edge and then both the electrode material and insulating layers may simultaneously be baked. Even in this case, the intensively reduced areas 16 also are formed below the edges of opposite electrodes 14a and 14b, thereby leading to an improvement in the breakdown voltage ability similar to the above example.

Furthermore, the present invention is not limited to form the gap between the edges of opposite electrodes and the ceramic dielectric. The opposite electrodes may be formed throughout toward the edge of ceramic dielectric.

In addition, the ceramic capacitor in the embodiment is provided at the two main surfaces with the opposite electrodes, but, for example, a ceramic capacitor provided at one surface with a pair of electrodes may be used. Concretely, the insulating layers need only be baked on at least the opposite edges of both opposite electrodes spaced from each other, thereby expecting improvement in breakdown voltage ability of this kind of ceramic capacitor.

Also, the insulating layers need not be formed across the edge of electrode and the ceramic dielectric, but only be formed on at least the edge of the electrode.

While an embodiment of the invention has been shown and described, the invention is not limited to the specific construction thereof, which is merely exemplary in the specification.

We claim:

1. A method for manufacturing a ceramic capacitor which comprises:

forming an assembly by coating portions of the surface of a dielectric ceramic mainly comprising metal oxide with an electrode composition mainly comprising a metal which is more readily oxidizable than said metal oxide, coating on at least the edges of said electrode composition an insulating composition for preventing penetration of air to said electrode composition and then baking said assembly in an oxidizing atmosphere, whereby electrodes having insulating layers thereon are formed on said dielectric ceramic and whereby portions of said dielectric ceramic beneath said insulating composition are reduced, thereby increasing the breakdown voltage of said capacitor.

2. The method as set forth claim 1, wherein a main constituent of said ceramic dielectric is a metal oxide of strontium titanate series or barium titanate series.

3. The method as set forth in claim 1, wherein said electrode material forming said electrodes is a conductive paste constituted mainly of aluminum powder and containing glass powder 4. The method for as set forth in claim 1, wherein said opposite electrodes are baked on the two opposite surfaces of said ceramic dielectric.

5. The method as set forth in claim 1, wherein said electrodes are baked in an arrangement on one surface of said ceramic dielectric.

6. A method for manufacturing a ceramic capacitor which comprises:

forming an assembly by coating portions of the surface of a dielectric ceramic mainly comprising metal oxide with an electrode composition mainly comprising a metal which is more readily oxidizable than said metal oxide, baking said electrode material on said surfaces to form electrodes thereon, coating at least the edges of said electrodes with an insulating composition to prevent air from reaching the coated portions of said electrodes and then baking said assembly in an oxidizing atmosphere, whereby electrodes having insulating layers thereon are formed on said dielectric ceramic and whereby the portions of said dielectric ceramic beneath said insulating composition are reduced, thereby increasing the breakdown voltage of said capacitor.

7. The method as set forth in claim 6, wherein a main constituent of said ceramic dielectric is a metal oxide of strontium titanate series or barium titanate series.

8. The method as set forth in claim 6, wherein said electrode material forming said electrodes is a conductive paste constitute mainly of aluminum powder and containing glass powder.

9. The method as set forth in claim 6, wherein said electrodes are baked on the two opposite surfaces of said ceramic dielectric.

10. The method as set forth in claim 6, wherein said electrodes are baked in an arrangement on one surface of said ceramic dielectric.

* * * * *